Oct. 15, 1957   G. MEINECKE ET AL   2,809,572
PHOTOGRAPHIC CAMERA WITH RANGE FINDER
Filed Nov. 10, 1955   2 Sheets-Sheet 1

INVENTORS
Gunther Meinecke
Walter Jung
BY
Benj. T. Rauber
their attorney

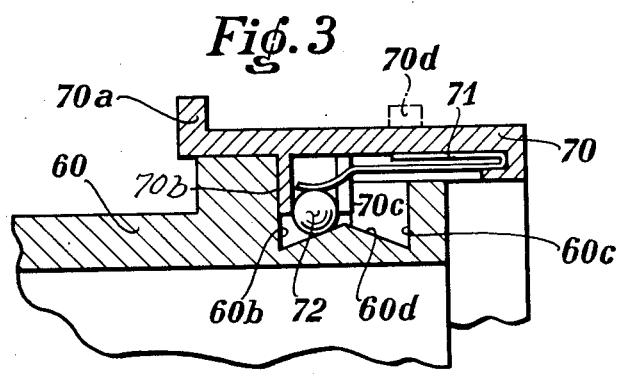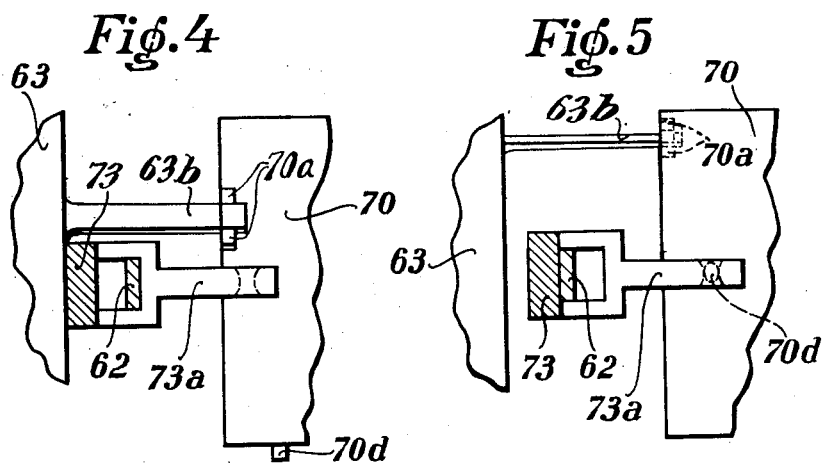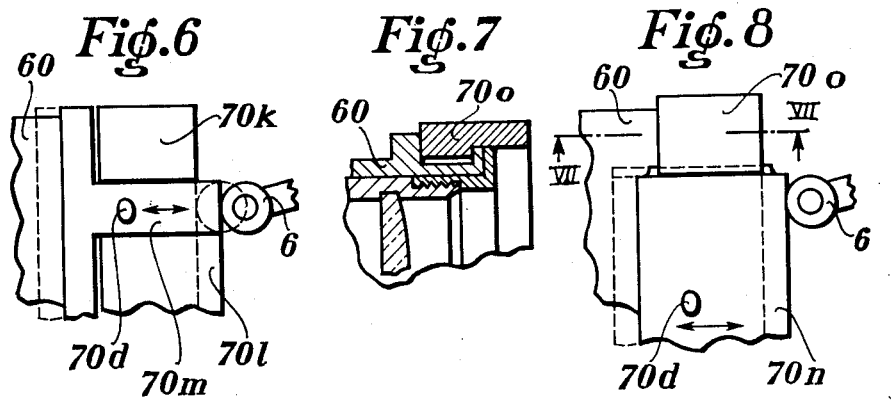

United States Patent Office 2,809,572
Patented Oct. 15, 1957

2,809,572

PHOTOGRAPHIC CAMERA WITH RANGE FINDER

Gunther Meinecke and Walter Jung, Wetzlar, Germany, assignors to Ernst Leitz, G. m. b. H., Wetzlar (Lahn), Germany, a corporation of Germany Application November 10, 1955, Serial No. 546,202

Claims priority, application Germany February 16, 1955

10 Claims. (Cl. 95—44)

Our invention relates to a photographic camera with a range finder, and coupled with them, an interchangeable objective for certain conditions, whose final focussing movement extends over at least two ranges of adjustment limited by stopping means. In our invention the entire positioning path of the adjustment mechanism of the range finder is available for each range of adjustment. Upon passing from one adjustment range to the other the insertion or withdrawal of the stopping means follows in dependence upon the mounting or detaching of the optical attachment of the range finder.

Arrangements of this general type have been known. It has been proposed to utilize a stepped curve for the adjustment of the distance meter whereby the steps are joined by a sloped plane. This, however, requires that between the several adjustment ranges there are sections in which the distance meter is not usable. It is already known to provide safety arrangements in which the shifting of the objectives from one range of measurement to another is made possible only in dependence upon the mounting or removal of the optical attachment member for the distance meter.

Our invention makes possible the continuous transition from one adjustment range to the next. In accordance with the invention this is attained by arranging axially slidable at least one part of the guiding rail transferring in known manner the adjustment movement of the objective to the actuating element of the range finder in addition to the focussing movement to thereby cause the transition from one adjustment range to another. In this manner the supplemental axial shifting serves to set back the adjustment mechanism of the range finder to its starting position ($\infty$-position).

In an advantageous embodiment of our invention the guiding rail for all ranges of positions can be constructed integrally and continuous and, in its entirety for a known part of the path of objective adjustment, can also be axially slidable in addition to the focussing movement.

In other embodiments of the invention, however, one of at least two parts of the guide rail corresponding to two measurement ranges can be slidable axially.

According to a further embodiment of the invention the guide rail can, moreover, also be formed as a stepped curve and only the transition from one step to the next is brought about by supplemental axially slidable guide rail parts.

The supplemental axial shifting to the guide rail or guide rail parts follows, in accordance with the invention, in dependence upon the mounting or dismounting of optical supplemental elements for the range finder with simultaneous reversal of the stop elements for the respective adjustment range. In this manner, in a further modification of the invention, actuating and transition elements for shifting the supplemental axially slidably positioning rail and positioning rail parts respectively may be provided to project into the area of the mounting socket for the optical attachments, which stand effectively under the action of automatically acting return means. Also the actuation of the additional or supplemental axial shifting can follow through the mounting of the carrier of the optical attachments themselves whereby the carrier is provided with a disconnect stop element, which serves for securing the carrier on the socket connected with the coupling mounting of the objective.

The various features of the invention are illustrated by way of example in the accompanying drawings, in which Fig. 1 is a sectional view of a part of a camera and a part section of an objective without an optical attachment for the range finder;

Fig. 3 is a sectional view on a larger scale, taken in a plane through the axis of longitudinal movement, of a part showing the axial shiftable positioning rail and associated elements;

Fig. 4 is a schematic section taken on line IV—IV of Fig. 1 on an enlarged scale of a portion of the positioning rail and coupling and transmission elements for moving the rail;

Fig. 5 is a view similar to that of Fig. 4 taken on line V—V of Fig. 2 showing the elements in a different position;

Fig. 6 is a schematic showing a positioning rail having a stepped curve with axially shiftable rail part for the transmission from one curve step to another;

Fig. 7 is a section on the line IV—IV of Fig. 8, and

Fig. 8 is a schematic showing of a further positioning rail embodiment whereby a positioning rail part of one of at least two adjustment ranges is axially slidable.

Figure 1:
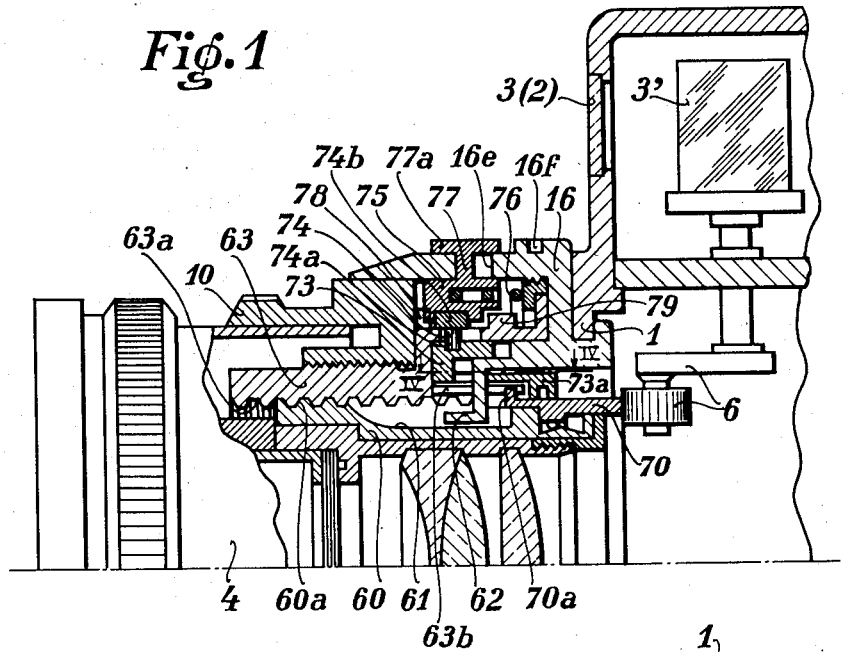
Figure 2:
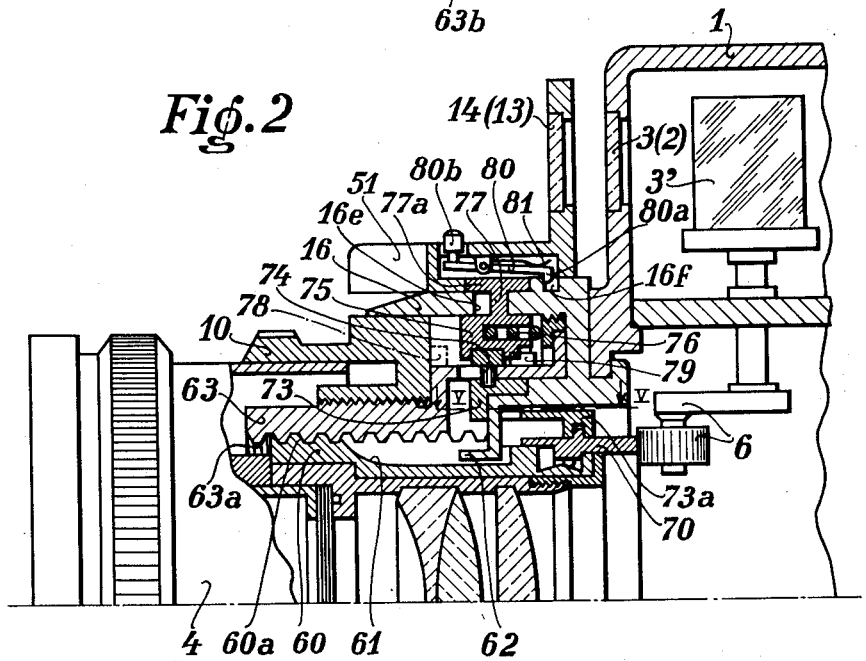
Fig. 2 is a view similar to that of Fig. 1 but with an optical attachment for the range finder mounted on the objective mounting.

According to Figs. 1 and 2, an objective 4 is detachably mounted on a housing 1 of a photographic camera by means of a coupling mounting 16. The camera is provided in the usual manner with a range finder whose movable deflecting element 3' cooperates through a governing lever 6 with a positioning rail 70 of the objective 4. The tiltable deflecting element 3' of the range finder is positioned in the region of the range finder window 3 of the camera housing 1. The other light beam exit window together with the parts relating thereto—the end element and other units of the range finder—are not illustrated as they do not relate to the invention. The final focussing of the objective 4 follows from the rotation of the turning, hand operated, ring 10 of the adjustment mounting 63, which by means of a screw thread 63$^a$ screws onto a complementary screw thread 60$^a$ of the lens carrier 60 and displaces the latter axially. By means of a straight, axial, guide slot 61 in the carrier and a tongue 62 fixed on the coupling mounting 16, the carrier is guided in a straight line axial direction during the adjustment. The adjustment mounting 63 also has a coupling element 63$^b$ which extends into the region of a coupling element 70$^a$ connected with the positioning rail 70 and through this coupling transmits the rotational movement of the adjusting screw 63, 63$^a$ to the positioning rail 70, as indicated in Figs. 4 and 5, without however interfering with its axial adjustment. An arrangement of this type is shown and described by way of example in the pending application Ser. No. 495,613, now Patent No. 2,734,434.

As shown in Fig. 3 the positioning rail 70 is so mounted on the carrier of the objective lenses 60 that it is slidable axially between stop faces 60$^b$ and 60$^c$ of the carrier 60, Fig. 3. To this end the positioning rail 70 is provided with stop faces 70$^b$ and 70$^c$ which work against the face 60$^b$ and 60$^c$ respectively of the lense carrier. Between the stop faces 70$^b$ and 70$^c$ at least one sphere 72 is mounted at the positioning rail 70 and pressed by a spring 71 against a supporting surface 60$^d$ between the stop faces 60$^b$ and 60$^c$ inclined from a peak or ridge so that the sphere is pressed on one or the other of the inclined surfaces and thus against one of the stop faces 60$^b$ or 60$^c$. Accordingly at all times, whether the spring loaded sphere 72 is on one or the other side of the peak or ridge of the supporting way 69$^d$, the stop faces 60$^b$, 70$^b$ or alternatively the stop faces 60$^c$, 70$^c$ are held by the action of the spring 71 in contact.

Within the coupling mounting 16 are mounted axially slidable transmission and connecting elements 73, 74$^a$, 74$^b$, 75 through which the connecting element 73, at certain positions of the objective adjustment mounting, can, through an axially extending arm 73$^a$, come into a coupling union with a coupling cam 70$^d$ of the positioning rail 70, Fig. 5. The arm 73 is mounted and slidable axially with the adjustment screw 63 and encircles forkwise with its arm 73$^a$ the tongue 62 of the direct guiding element (Figs. 4 and 5). The arm 73 is provided at its upper surface with a guide groove which engages at least one peg 74$^a$ of a transfer arm 74. The peg 74$^a$ extends through a slot in the adjustment screw 63 and is shiftable axially therein. The pegs 74$^a$ are fastened on a ring 74$^b$ which in turn is mounted to slide axially on the adjustment screw 63. The ring 74$^b$ which turns with the rotation of the screw 63 is engaged by the forked part of the member 75 which is adjustable in the axial direction and which is biased by the spring 76. The return spring at all times resiliently presses the elements 73, 74 and 75 toward the position shown in Fig. 1. An arm 77 of the element 75 extends through an opening 16$^e$ of the coupling mounting 16 and is provided outside this opening with a lug 77$^a$.

The coupling mounting 16 is formed in the region of the opening 16$^e$ and lug 77$^a$ respectively with a support for the carrier 51, Fig. 2, of attachment elements 14, 13 of the range finder. Upon sliding on the carrier 51 the attachment elements 14 (13) are in position in front of the range finder exit windows 3 (2). The coupling mounting 16 is also provided with an opening 16$^f$ in which upon sliding on the carrier 51 projects a nose or hook 80$^a$ of a stop or latch lever 80, pressed by a spring 81 toward the opening and having hand operated element 80$^b$ by means of which the return movement of the carrier under the action of the reversing spring 76 is prevented until, by pressure on the element 80$^b$, the nose or hook 80$^a$ is disengaged from the stop opening 16$^f$.

In the movement area of the transmission element 75 are stop segments 78 and 79 spaced axially from each other and joined to the adjustment screw 63, 63$^a$ and rotating therewith, which serve as limits for the adjustment range and by which whenever, in a certain position of the adjusting screw and of the transmission member 75 the latter comes into contact with it, the further movement of the adjusting screw 63, 63$^a$ stops.

The mode of operation of the apparatus is as follows:

First let the adjusting action be considered in the normal range of the objective for example in the adjustment ∞ Figs. 1 and 4. Optical attachments for the range finder are not necessary in this range. Accordingly the transmission elements 73, 74 and 75 and the axially shiftable positioning rail 70 are in the position shown in Fig. 1. The adjustment range is limited by the co-action between the stop segment 78 and the transmission element 75. For fine focussing of the objective 4 the adjusting screw 63, 63$^a$ is turned by turning of the turning ring 10 and this turning movement is transformed into an axial shifting by means of the screw threads 60$^a$ and the axial guide 61, 62. The positioning rail 70 takes part in this axial shifting of the objective 4 through the coupling action which takes place as the stop face 60$^b$ is held in contact with the stop face 70$^b$ through the sphere 72 acted upon by the spring 71, Fig. 3. Simultaneously the turning movement of the adjusting screw is transmitted to the position rail 70 over the coupling arm 63$^b$ and the coupling fork 70$^a$ of the positioning rail 70, Figs. 1, 3, 4 and 5. At the end of the adjustment range as the stop segment 78 comes into contact with the transmission element 75 the forked end of the coupling arm 73$^a$ couples with the coupling cam 70$^d$ of the positioning rail 70 (Fig. 5).

A further rotation of the hand ring 10 in the direction to the neighboring adjustment range is only possible if previously the transmission element 75 has been moved by axial shifting out of the range of the stop element 78. That will be attained by sliding the carrier 51 of the optical attachment elements 14, 13 onto the socket on the coupling mounting 16 and thereby the transmission elements 73—77 have been brought into the position shown in Fig. 2. Hereby the return positioning spring 76 is compressed and simultaneously the transmission element 75 acting as a stop is brought out of the range of the stop segment 78 which limits forward rotation into the range of the other stop segment 79 which prevents reverse turning. Simultaneously with this the positioning rail is shifted by the coupling arm 73$^a$ to the other end position so that stop face 60$^c$, Fig. 3, and stop face 70$^c$ are held in engagement with each other through the coupling action of the sphere 72 acted on by the spring 71. The shifted position of the transmission elements shown in Fig. 2 is insured by engagement of the hook 80$^a$ of the spring latch 80, 81 in the latch opening 16$^f$ of the coupling mounting 16.

The axial shifting of the positioning rail 70 is transmitted through the governing lever 6 of the range finder to the deflection element 3' whereby the positioning paths are so measured that the tiltable deflection element 3' is brought into ∞—position of the range finder. Now a further actuation of the adjusting screw 63, 63$^a$ by means of the turning ring 10 in the direction of a further fine focussing is possible, whereby for this near focussing again the entire near focussing range of the range finder is available. The forked end of the coupling arm 73$^a$ again comes out of engagement with the coupling cam 70$^d$ of the positioning rail 70.

The construction and mode of action have been explained in the above on the basis of an added positioning rail slidable in its entirety. According to Fig. 6 the positioning rail can be constructed for at least two adjustment ranges as a stepped curve 70$^k$, 70$^l$ whereby a positioning rail part 70$^m$ belonging to both is axially slidable as an accessory, in order to transfer the lever 6 of the range finder from the level of the curved step 70$^k$ to the level of the curved step 70$^l$. The seating of the two positioning rail parts 70$^k$ and 70$^l$ on the lens carrier 60 follows about in the manner shown in Fig. 7 for the positioning rail part 70$^o$ of the example shown in Fig. 8 while the accessory axially slidable positioning rail part 70$^m$ is seated on the carrier 60 in the manner shown in Fig 3. The transmission of the rotational movement of the adjusting screw 63 to the positioning rail parts 70$^k$, 70$^l$ and 70$^m$ and the supplemental axial shifting of the positioning rail part 70$^m$ follows analogously to that of the embodiment shown by way of example in Figs. 1–5.

Fig. 8 shows schematically a further embodiment of the invention. In this embodiment the adjusting rail 70 is divided into two guides rail parts 70$^n$ and 70$^o$. The part 70$^o$, which is provided for example for adjustment in the normal range, is mounted on the object carrier 60 in the same manner as shown in Fig. 7. The part 70$^n$ which is provided for adjustment in the near range is arranged to slide axially on the objective carrier 60 in about the manner as it is shown in Fig. 3. The axial shifting may follow in the same manner as in the embodiments of Figs. 3 to 5 for the entire adjusting rail 70 and as in the embodiment of Fig. 6 for the adjustment rail part 70$^m$.

Having described our invention, what we claim is:

1. A photographic camera having an objective, a focussing mounting for said objective comprising a fixed part, a rotatable part in fixed axial position on said fixed part and a non-rotatable, objective carrying, part engaging said rotatable part to be moved axially by the rotation of said rotatable part, a range finder on said camera, an optical attachment for said range finder detachably mountable on the fixed part of the focussing mounting, stop segments fixed on said rotatable part of said focussing mounting in positions spaced axially and angularly of the axis of said part to limit ranges of focussing, an axially slidable stop element mounted on said fixed part of said adjustment mounting and slidable by the mounting and demounting of said optical attachment in the space between said stop segments from contact position of one stop segment to contact position of the other stop segment to determine the limit of rotation of the rotatable part of the focussing mounting, an adjustment track contacting an actuating element of the range finder and rotatable with the rotatable part of said focussing mounting, a coupling from at least part of said track to the axially slidable part of said focussing mounting to move said track axially with said part, said coupling having two alternative axially spaced coupling positions on said objective carrying part and means actuated by said stop element to move said coupling from one coupling position to the other.

2. The apparatus of claim 1 having a spring pressing said stop element in contact with one stop segment, and in which said optical attachment is slidable onto said housing and into engagement with said stop element to move said stop element into contact with the other of said stop segments and having means to hold said attachment on said housing.

3. The apparatus of claim 1 comprising a transmission element connecting said non-rotatable objective carrying part to said adjustment track, a pair of axially spaced stop faces on said element, a pair of complementary stop faces on said adjustment track and a spring pressed mechanism to hold one or the other of the stop faces of the means into contact with a complementary face of the positioning rail.

4. The photographic camera of claim 1 in which said coupling comprises a coupling cam projecting radially from said axially slidable track element and an arm extending from said axially slidable part of said focussing mounting and parallel to the axis thereof to overlap said axially slidable track element and having a transverse recess to engage said cam element.

5. The photographic camera of claim 1 having a coupling arm extending from the rotatable part of said focussing mounting to overlap part of the track adjustment track and projections on said adjusting track to engage said arm and slidable axially thereof.

6. Apparatus of claim 1 in which said adjustment track is continuous and integral and is shiftable in its entirety by said transmission element and connecting element.

7. Apparatus of claim 1 in which a part only of said adjustment track of at least two parts is shiftable.

8. The apparatus of claim 1 in which the adjustment track contacting said element of said range finder is stepped and has an accessory axially slidable positioning track part for transfer of said element of said range finder from one step to another.

9. The apparatus of claim 2 in which said means comprises a spring pressed latch.

10. The apparatus of claim 3 in which said spring pressed mechanism comprises an element having a surface between a pair of said stop faces of one element of said means and adjustment track, and inclined to a ridge between said stop faces, a ball movable to either side of said ridge and a spring on the other element pressing said ball against said inclined surface.

References Cited in the file of this patent

UNITED STATES PATENTS 2,734,434  Leitz _____ Feb. 14, 1956